(12) United States Patent
Amano

(10) Patent No.: US 8,213,032 B2
(45) Date of Patent: Jul. 3, 2012

(54) INFORMATION PROCESSING APPARATUS AND METHOD AND COMPUTER-READABLE STORAGE MEDIUM THEREOF

(75) Inventor: Hiroyuki Amano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 586 days.

(21) Appl. No.: 12/423,675

(22) Filed: Apr. 14, 2009

(65) Prior Publication Data

US 2009/0257079 A1 Oct. 15, 2009

(30) Foreign Application Priority Data

Apr. 15, 2008 (JP) ................................ 2008-105357

(51) Int. Cl.
*G06F 15/00* (2006.01)
*G06F 15/17* (2006.01)
(52) U.S. Cl. ....................................... 358/1.14; 709/217
(58) Field of Classification Search .................. 358/1.15
See application file for complete search history.

(56) References Cited

U.S. PATENT DOCUMENTS

2003/0174347 A1* 9/2003 Gonzalez et al. .............. 358/1.6

FOREIGN PATENT DOCUMENTS

JP 2004-265425 A 9/2004

* cited by examiner

*Primary Examiner* — Saeid Ebrahimi Dehkordy
(74) *Attorney, Agent, or Firm* — Canon U.S.A., Inc., IP Division

(57) ABSTRACT

An information processing method of an information processing apparatus that receives a job ticket, includes performing a function according to the job ticket, and determining whether a notification that the process has normally ended is received. In one embodiment, if it is determined that the notification is not received, a JDF analysis/correction unit may search for a confirmed subsequent function in the system based on a system map, and can determine whether there is another apparatus including the subsequent function in the system based on the search result. If the JDF analysis/correction unit determines that there is another apparatus including the subsequent function, the job ticket is updated and transmitted to the subsequent apparatus, along with input data.

9 Claims, 18 Drawing Sheets

FIG.5

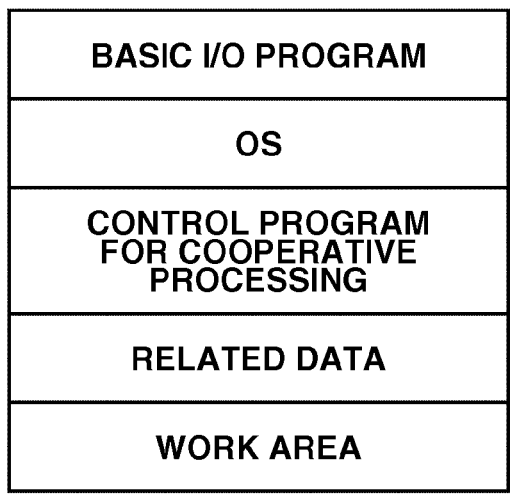

| BASIC I/O PROGRAM |
| OS |
| CONTROL PROGRAM FOR COOPERATIVE PROCESSING |
| RELATED DATA |
| WORK AREA |

FIG.6

```
<JDF xmlns="http://www.CIP4.org/JDFSchema_1_1"
   ID="J1"Status="Waiting"Type="Combined"
   Types="DisitalPrinting folding Stitching cutting"Version="1.2">
  <ResourceLinkPool>
    <!--folding parameters-->
    <FoldingParamsLink CombinedProcessIndex="1"Usage="Input"rRef="L3"/>
    <!--Stitching parameters-->
    <StitchingParamsLink CombinedProcessIndex="2"Usage="Input"rRef="L4"/>
    <!--Cutting parameters-->
    <CuttingParamsLink CombinedProcessIndex="3"Usage="Input"rRef="L4"/>
  </ResourceLinkPool>
</JDF>
```

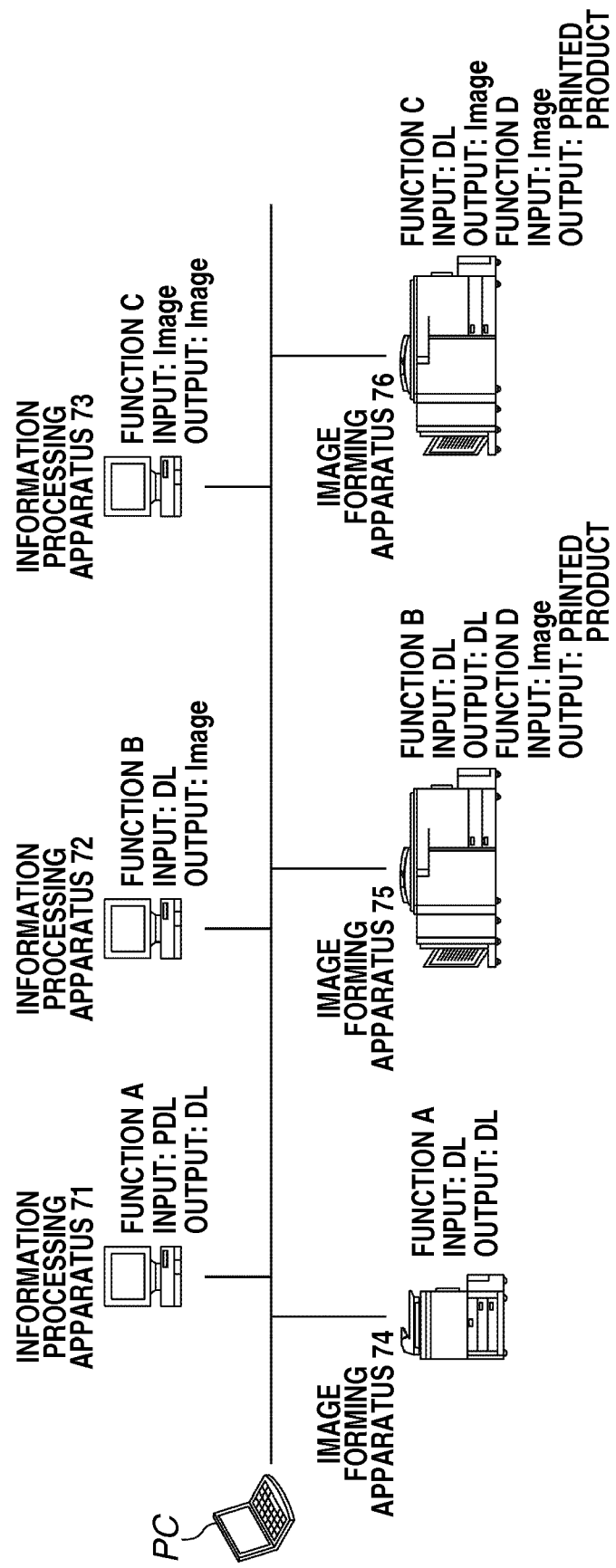

FIG.8A

| USER SELECTION | FUNCTION 81: FUNCTION A, FUNCTION B, FUNCTION C, FUNCTION D<br>OUTPUT DEVICE 82: IMAGE FORMING APPARATUS 76 |

SYSTEM DETERMINATION INITIAL PATH 83: INFORMATION PROCESSING APPARATUS 71 (FUNCTION A) → INFORMATION PROCESSING APPARATUS 72 (FUNCTION B) → INFORMATION PROCESSING APPARATUS 73 (FUNCTION C) → IMAGE FORMING APPARATUS 76 (FUNCTION D)

FIG.8B

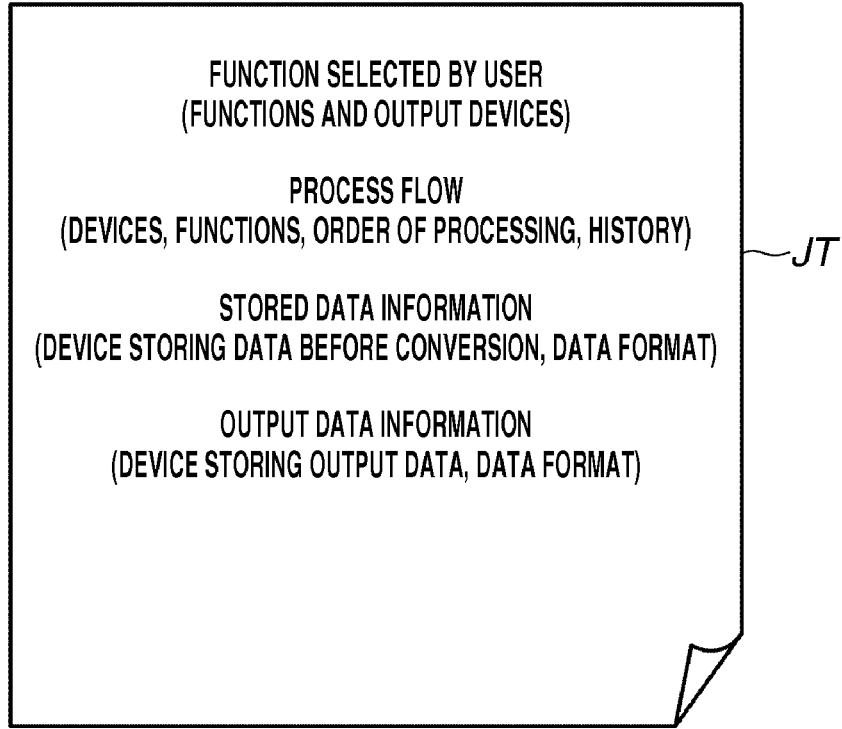

FUNCTION SELECTED BY USER
(FUNCTIONS AND OUTPUT DEVICES)

PROCESS FLOW
(DEVICES, FUNCTIONS, ORDER OF PROCESSING, HISTORY)

STORED DATA INFORMATION
(DEVICE STORING DATA BEFORE CONVERSION, DATA FORMAT)

OUTPUT DATA INFORMATION
(DEVICE STORING OUTPUT DATA, DATA FORMAT)

| DEVICE IDENTIFICATION INFORMATION | LOCATION INFORMATION | FUNCTION IDENTIFICATION INFORMATION | INPUT DATA FORMAT | OUTPUT DATA FORMAT |
|---|---|---|---|---|
| INFORMATION PROCESSING APPARATUS 71 | IP ADDRESS, ETC. | FUNCTION A | PDL | DL |
| INFORMATION PROCESSING APPARATUS 72 | IP ADDRESS, ETC. | FUNCTION B | DL | Image |
| INFORMATION PROCESSING APPARATUS 73 | IP ADDRESS, ETC. | FUNCTION C | Image | Image |
| IMAGE FORMING APPARATUS 74 | IP ADDRESS, ETC. | FUNCTION A | DL | DL |
| IMAGE FORMING APPARATUS 75 | IP ADDRESS, ETC. | FUNCTION B | DL | DL |
| | | FUNCTION D | Image | Image |
| IMAGE FORMING APPARATUS 76 | IP ADDRESS, ETC. | FUNCTION C | DL | Image |
| | | FUNCTION D | Image | Image |
| | | | | |

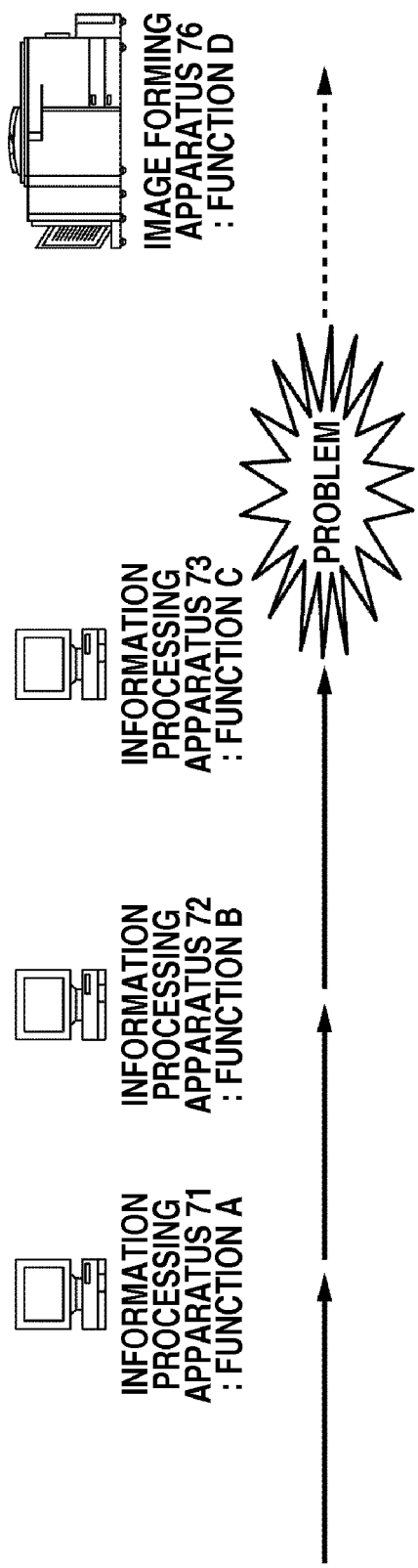

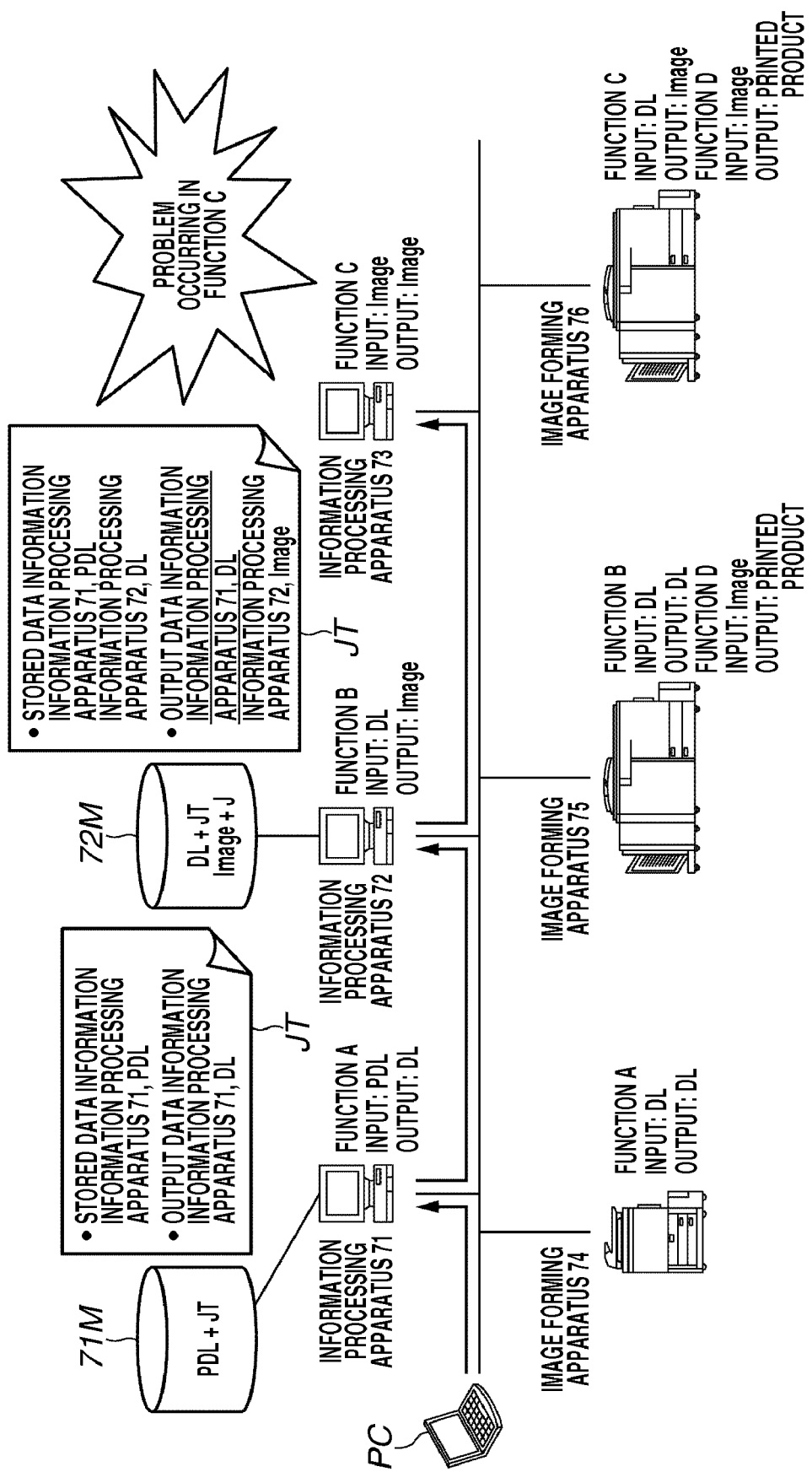

FIG.17

STORAGE MEDIUM e.g., FD/CD-ROM

| DIRECTORY INFORMATION |
|---|
| FIRST DATA PROCESSING PROGRAM PROGRAM CODE GROUP CORRESPONDING TO STEPS IN FLOWCHART ILLUSTRATED IN FIG. 15 |
| SECOND DATA PROCESSING PROGRAM PROGRAM CODE GROUP CORRESPONDING TO STEPS IN FLOWCHART ILLUSTRATED IN FIG. 16 |
| |
| |
| |

INFORMATION PROCESSING APPARATUS AND METHOD AND COMPUTER-READABLE STORAGE MEDIUM THEREOF

BACKGROUND OF THE INVENTION

1. Field of the Invention

The present invention relates to information processing in an information processing apparatus including an image forming apparatus and an image processing system that performs a cooperative function.

2. Description of the Related Art

Nowadays, there is rapid development in electrophotographic techniques. High-quality printing results that were conventionally realized by techniques such as anastatic printing can now be realized by electrophotography. For example, recent electrophotographic techniques include binding various types of papers, and image processing such as correcting shifts in color or printing, that were not available in previous electrophotographic techniques.

Further, special finishers such as a cutting unit can be connected to electrophotographic apparatuses, so that various printing results can be achieved in the field of electrophotography. An example of such a system is illustrated in FIG. 18.

Along with such realization of various printing techniques in the field of electrophotography, a technology level of electrophotographic apparatuses has become diversified. More specifically, since it may be inappropriate to concentrate various techniques in one apparatus in terms of user-friendliness and cost, a technique matching the target level of each product may be installed in each product.

For example, cost may be preferred over function in an electrophotographic apparatus targeted for home-use and small offices.

Further, an electrophotographic apparatus retaining a certain level of function and of high performance may be required for a general office use. On the other hand, a variety of functions as well as cooperation with various finishers may be required in industrial printing, in addition to performance.

As a result, functions installed in each electrophotographic apparatus are typically different. Further, processes that can be realized by electrophotographic apparatuses in each office and on each floor may be different.

Under such circumstances, cooperation between functions becomes necessary to improve the environment in which the provided functions can be widely used.

More specifically, a printing function can be widely used by cooperation between functions included in all electrophotographic apparatuses installed in each office, instead of using only those functions that are closed inside each individual electrophotographic apparatus.

To realize such cooperation between functions, it is may be necessary to understand the types of electrophotographic apparatuses and functions connected in the printing system via a network that can be used.

However, it can be burdensome for a user to acquire such information about the apparatuses and functions. Further, such a system may become difficult for a user to handle. Therefore, a system realizing cooperative functions may be important in which the user is only required to select a function that the user wants to use from a list of usable functions, and the system determines how the process will be performed.

Further, if handling of the processing is left to the system, it can become necessary for the system to automatically solve a problem that may occur during the processing.

To realize such a system, there is a method of setting a server within a system that manages the system.

More specifically, the server has full knowledge of the electrophotographic apparatus and functions provided in a printing system connected to a network, and determines an appropriate process flow according to a user setting.

Further, there is a system in which, when a problem occurs, a server searches for a similar module (i.e., a module including a function whose input data are the same and the process result is the same) in the system. The system then searches for a substitute process flow based on the search result and automatically performs such a substituting process. Therefore, unnecessary procedures performed by a user can be reduced to a minimum.

However, such a cooperative function system may require a large investment for a small-scale office. Further, there can be other problems such as excessive traffic due to constant communication with the server, so that it may be necessary to realize cooperative function without the server.

Furthermore, as electrophotographic apparatuses become highly-functional, load distribution increases when performing the image processing as described below.

Under the present circumstances, as the number of functions increase, processes that are required to be concurrently performed also increase. As a result, a backlog is generated, which affects the performance of the entire printing process in the electrophotographic apparatus.

To solve such a problem, a load distribution process is devised by setting a plurality of locations that can perform the same process in each step of the electrophotographic process. Each function is thus performed at an appropriate timing.

Electrophotographic printing can be largely divided into four processing steps.

A first step is a process performed in a host (printer driver) that gives a print instruction. A second step is a process performed on a controller side that receives page description language (PDL) data output from the host. A third step is a process performed when the PDL data are converted into an intermediate language appropriate for processing inside the electrophotographic apparatus. A fourth step is a process performed after rasterizing the converted data into an image.

For example, if both the printer driver and the controller can perform a process such as imposition, the process can be performed at a location most suitable in consideration of other set functions. As a result, a plurality of functions that can acquire the same result using input data in different formats are beginning to exist within a system.

However, the conventional method only searches for the same function in the system as a substitute function when a problem occurs.

More specifically, a function that realizes a process using different input data will not be searched for and used as a substitute function even if the function can acquire a similar result.

Therefore, it is necessary to configure a cooperative function system which realizes load distribution and can also utilize another function as a substitute function, if the function can acquire a similar result even if the input data is different.

For example, there is a cooperative function method using a job ticket (JT) in which a function and process procedure are described (refer to Japanese Patent Application Laid-Open No. 2004-265425). In such a method, each printing function is processed according to a description in the JT and the process history is described in the JT.

However, in the method discussed in Japanese Patent Application Laid-Open No. 2004-265425, a problem may occur when function processing is being executed based on a description in a job ticket (JT), so that one of the function processing is not normally ended.

In such a case, a conventional system only detects that the information processing apparatus which processed a function before the problem occurred is not normally ended. The process based on the job ticket is discontinued, and a cancelled state is continued in the process. Therefore, a process in which a plurality of functions is cooperatively performed cannot be definitely completed.

SUMMARY OF THE INVENTION

According to an aspect of the present invention, an information processing apparatus is provided that executes a part of cooperative processing in a system which provides cooperative processing using a plurality of information processing apparatuses, based on a job ticket in which contents of a plurality of processes, an order of processes, and an information processing apparatus which executes each process are described. The information processing apparatus includes a receiving unit configured to receive the job ticket and data that are a target of cooperative processing, a processing unit configured to process the data using functions included in the information processing apparatus based on the job ticket, a storing unit configured to store processed data processed by the processing unit when a process is normally completed by the processing unit, and a transmission unit configured to transmit the job ticket and the processed data to an external apparatus which performs a subsequent process of the information processing apparatus designated by the job ticket. The information processing apparatus also includes an updating unit configured to update, if it is determined that the subsequent process failed in the external apparatus which performs the process subsequent to the information processing apparatus designated by the job ticket, a description on contents of the plurality of processes, the order of processes, and the information processing apparatus which executes each process in the job ticket, to realize cooperative processing described in the job ticket. The updating unit updates the job ticket not to include the external apparatus that failed the process.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain principles of the invention.

FIG. 5 illustrates an example of a memory map of a random access memory (RAM) in the image forming apparatus illustrated in FIG. 2.

FIG. 6 illustrates an example of a job ticket in an information processing system according to an exemplary embodiment of the present invention.

FIG. 7 illustrates an example of a configuration of an information processing system according to an exemplary embodiment of the present invention.

FIG. 8A illustrates a relation between functions to be integrated and an initial process path in the information processing system according to an exemplary embodiment of the present invention.

FIG. 8B illustrates an example of a content described in the job ticket illustrated in FIG. 6.

FIG. 10 illustrates a system map in the information processing system according to an exemplary embodiment of the present invention.

FIG. 11 illustrates an initial process path in the information processing system according to an exemplary embodiment of the present invention.

FIG. 12 illustrates a process of cooperatively performing functions in the information processing system according to an exemplary embodiment of the present invention.

FIG. 17 illustrates a memory map of a storage medium that stores various data processing programs readable by the information processing system according to an exemplary embodiment of the present invention.

DETAILED DESCRIPTION OF THE EMBODIMENTS

Various exemplary embodiments, features, and aspects of the invention will be described in detail below with reference to the drawings.

<System Configuration>

Figure 1A:
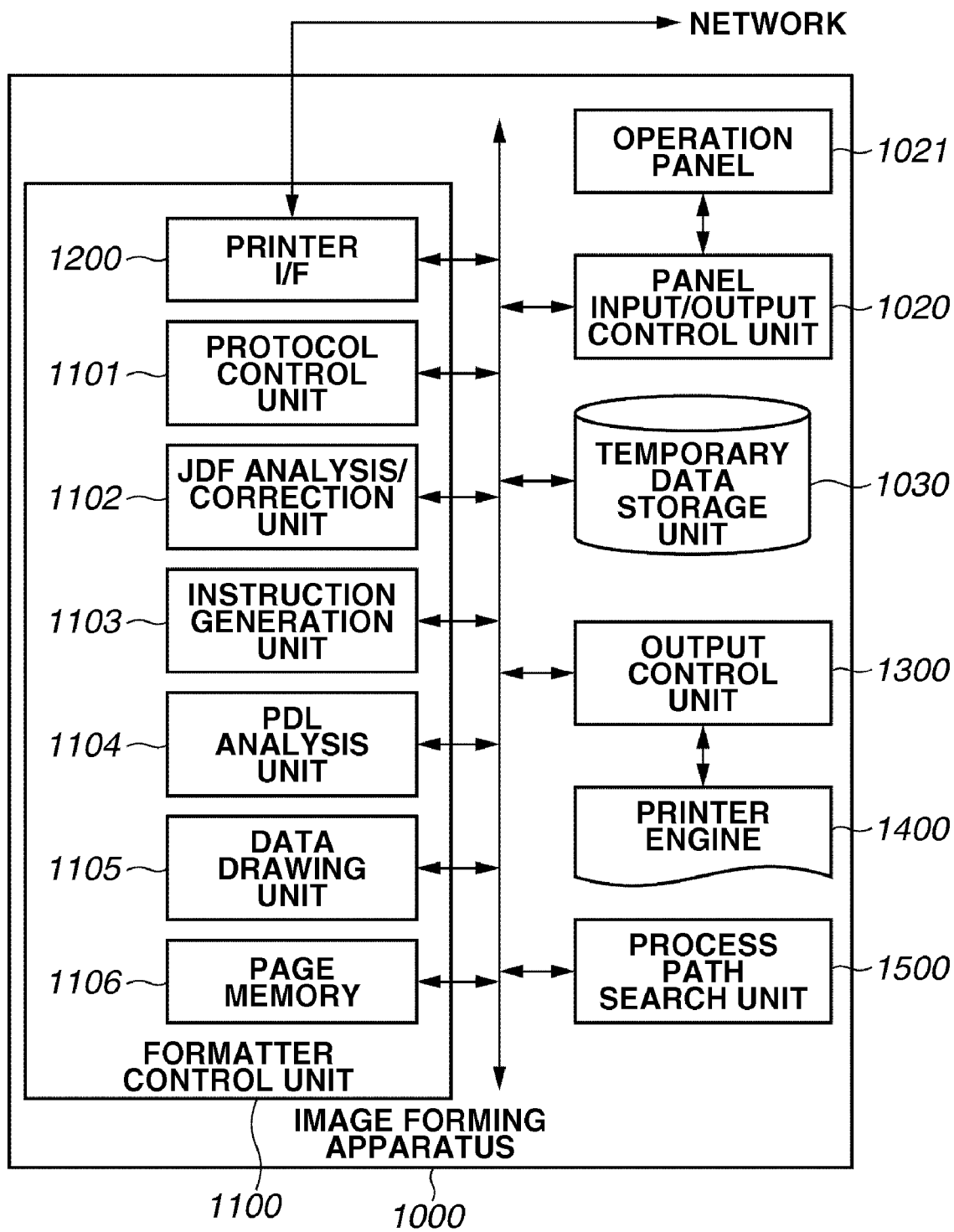
FIG. 1A is a block diagram illustrating an example of an image forming apparatus according to an exemplary embodiment of the present invention.

FIG. 1A is a block diagram illustrating an example of an image forming apparatus of the present exemplary embodiment. The image forming apparatus is included in a management system to be described below, as a printing apparatus which performs a printing function, or as a multifunction peripheral (MFP). Such MFP includes a printing function, a data communication function, and a scanner function.

Referring to FIG. 1A, the image forming apparatus roughly includes a formatter control unit 1100, a panel input/output unit 1020, a temporary data storage unit 1030, a printer interface 1200, an output control unit 1300, a printer engine unit 1400, and a process path search unit 1500.

The formatter control unit 1100 includes a protocol control unit 1101, a job definition format (JDF) analysis/correction unit 1102, an instruction generation unit 1103, a page description language (PDL) analysis unit 1104, a data drawing unit 1105, and a page memory 1106.

A printer interface (I/F) 1200 performs an input/output process with an external apparatus. The protocol control unit 1101 communicates with an external apparatus by analyzing and transmitting a network protocol.

The JDF analysis/correction unit 1102 analyzes received JDF data and recognizes processing steps, determines whether there is an offline process, and corrects the JDF as necessary.

The instruction generation unit 1103 combines the JDF and a style sheet to generate PDL data for outputting an instruction.

The PDL analysis unit 1104 analyzes the received PDL data and converts the PDL data to an intermediate code that can be more easily processed. The intermediate code generated by the PDL analysis unit 1104 is then transferred to the data drawing unit 1105 and processed.

The data drawing unit 1105 rasterizes the intermediate code into bitmap data, and the rasterized bitmap data are sequentially drawn in the page memory 1106.

The panel input/output control unit 1020 controls input and output from an operation panel 1021. The temporary data storage unit 1030 which stores output data or storage data is realized by a secondary storage device such as a hard disk (HD).

In general, the formatter control unit 1100 is configured by a computer system using a central processing unit (CPU), a read-only memory (ROM), and a RAM.

An output control unit 1300 converts contents of the page memory 1106 into video signals and transfers the video signals to the printer engine unit 1400. The printer engine unit 1400 is a printing mechanism that forms a visible image on a recording paper, based on the received video signals.

The process path search unit 1500 searches a print process path in a management system based on information about an analysis result of the JDF analysis/correction unit 1102.

Figure 1B:
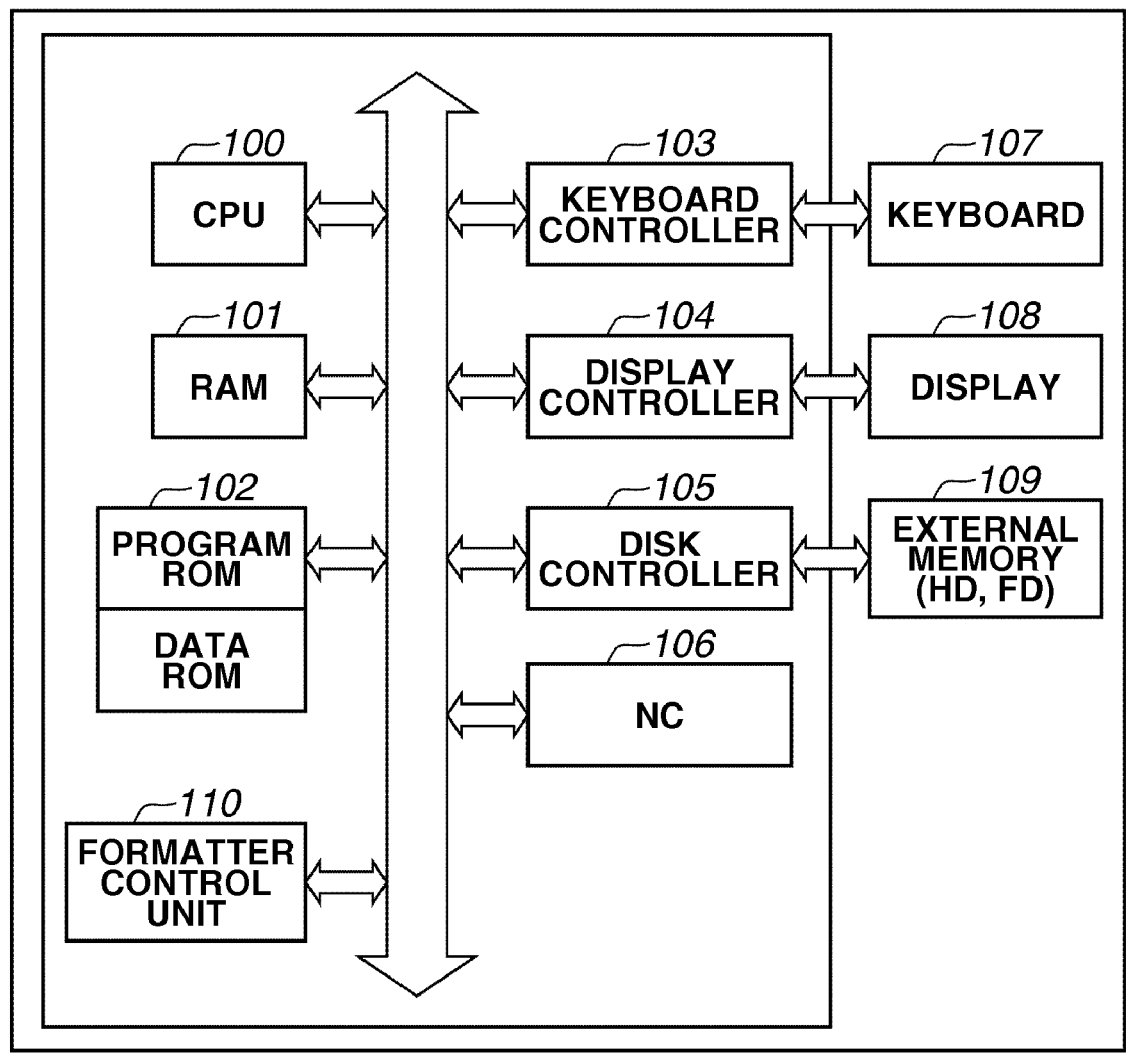
FIG. 1B is a block diagram illustrating a configuration of an information processing apparatus according to an exemplary embodiment of the present invention.

FIG. 1B is a block diagram illustrating a configuration of an information processing apparatus according to the present exemplary embodiment. The hardware configuration illustrated in FIG. 1B corresponds to a hardware configuration of a general information processing apparatus, and each personal computer (PC) in the present exemplary embodiment has a hardware configuration of the general information processing apparatus.

Referring to FIG. 1B, a CPU 100 executes an operating system (OS) and application programs stored in a program ROM in a ROM 102 or loaded into a RAM 101 from an external memory. The OS runs on a computer. Processes illustrated in each of the flowcharts described below are realized by executing the above-described programs.

The RAM 101 is a main memory and a work area of the CPU 100. A keyboard controller 103 performs control of a key input from a keyboard 107 or a pointing device (not illustrated). A display controller 104 controls display on a display unit 108. A disk controller 105 performs control of data access in an external memory 109, such as an HD which stores various data, or a Floppy® disk (FD). A network controller (NC) 106 is connected to a network and performs control of communication with other devices connected to the network.

Control programs stored in the external memory of the information processing apparatus illustrated in FIG. 1B include control programs that function as the JDF analysis/correction unit 1102, the instruction generation unit 1103, and the PDL analysis unit 1104 in the image forming apparatus illustrated in FIG. 1A. The CPU 100 executes the above-described control programs, so that the control programs function as a formatter control unit 110 illustrated in FIG. 1C.

Figure 1C:
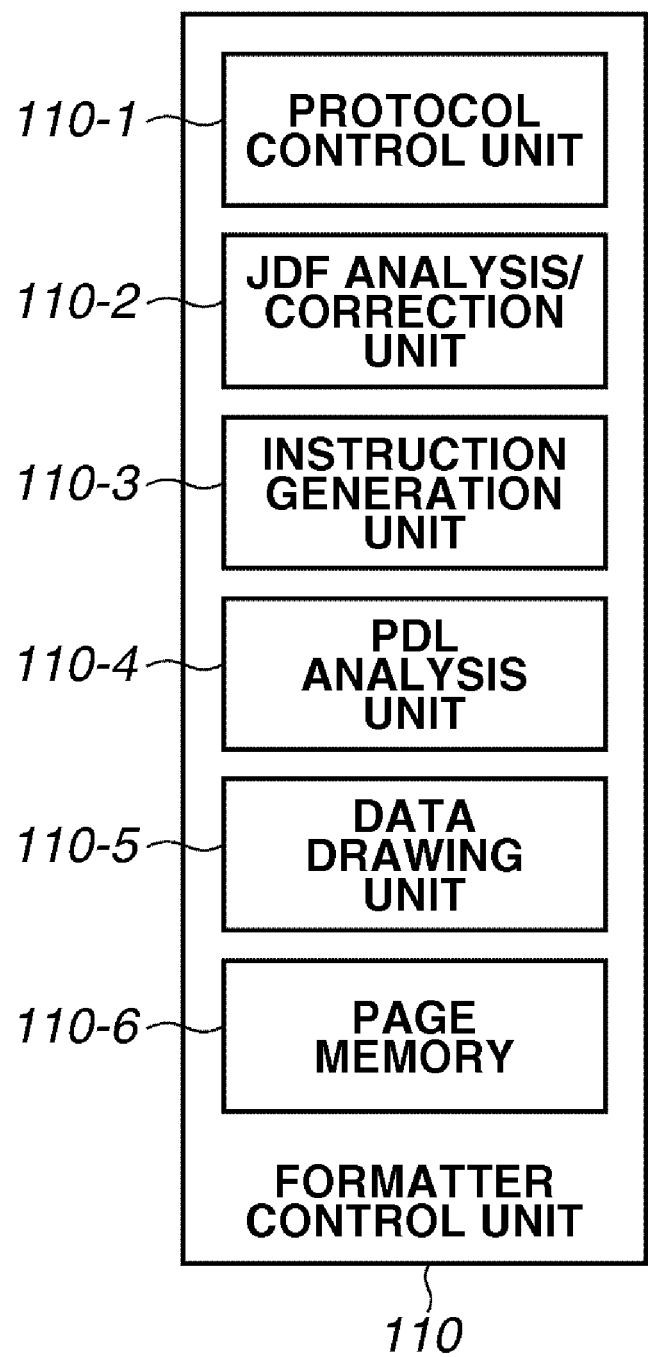
FIG. 1C is a block diagram illustrating an example of functions of a formatter control unit illustrated in FIG. 1B.

FIG. 1C is a block diagram illustrating functions of the formatter control unit 110 in the information processing apparatus illustrated in FIG. 1B.

Referring to FIG. 1C, the formatter control unit 110 includes a protocol control unit 110-1, a JDF analysis/correction unit 110-2, an instruction generation unit 110-3, a PDL analysis unit 110-4, and a data drawing unit 110-5. All of the units included in the formatter control unit 110 are realized by loading a control program stored in the external memory 109. Further, the formatter control unit 110 includes a process path search unit 110-6, which executes a similar process as the process path search unit 1500 in the image forming apparatus illustrated in FIG. 1A. More specifically, if a problem occurs when the information processing apparatus and the image forming apparatus perform a cooperative function, a substitute process path can be searched, as will be described below.

Returning to FIG. 1B, the external memory 109 in the information processing apparatus stores control programs that function as the PDL analysis unit 1104, the data drawing unit 1105, and the process path search unit 1500 in the image forming apparatus illustrated in FIG. 1A. Further, the CPU 100 realizes PDL analysis process, data rendering process, and process path search process by executing the above-described control programs that function as the formatter control unit 110.

Further, the information processing apparatus transmits a result of interpreting and executing the JDF to a subsequent information processing apparatus or image forming apparatus via the NC 106. The information processing apparatus can also receive a processing result from the subsequent information processing apparatus or image forming apparatus via the NC 106.

Similarly, the CPU 100 executes the above-described programs to perform a predetermined image processing on input data, and outputs the processing result as output data to other devices.

The external memory 109 can store a table that corresponds to a system map illustrated in FIG. 10 described below, or acquire the latest system map by communicating with an external apparatus and temporarily storing the acquired system map in the RAM 101.

Figure 2:
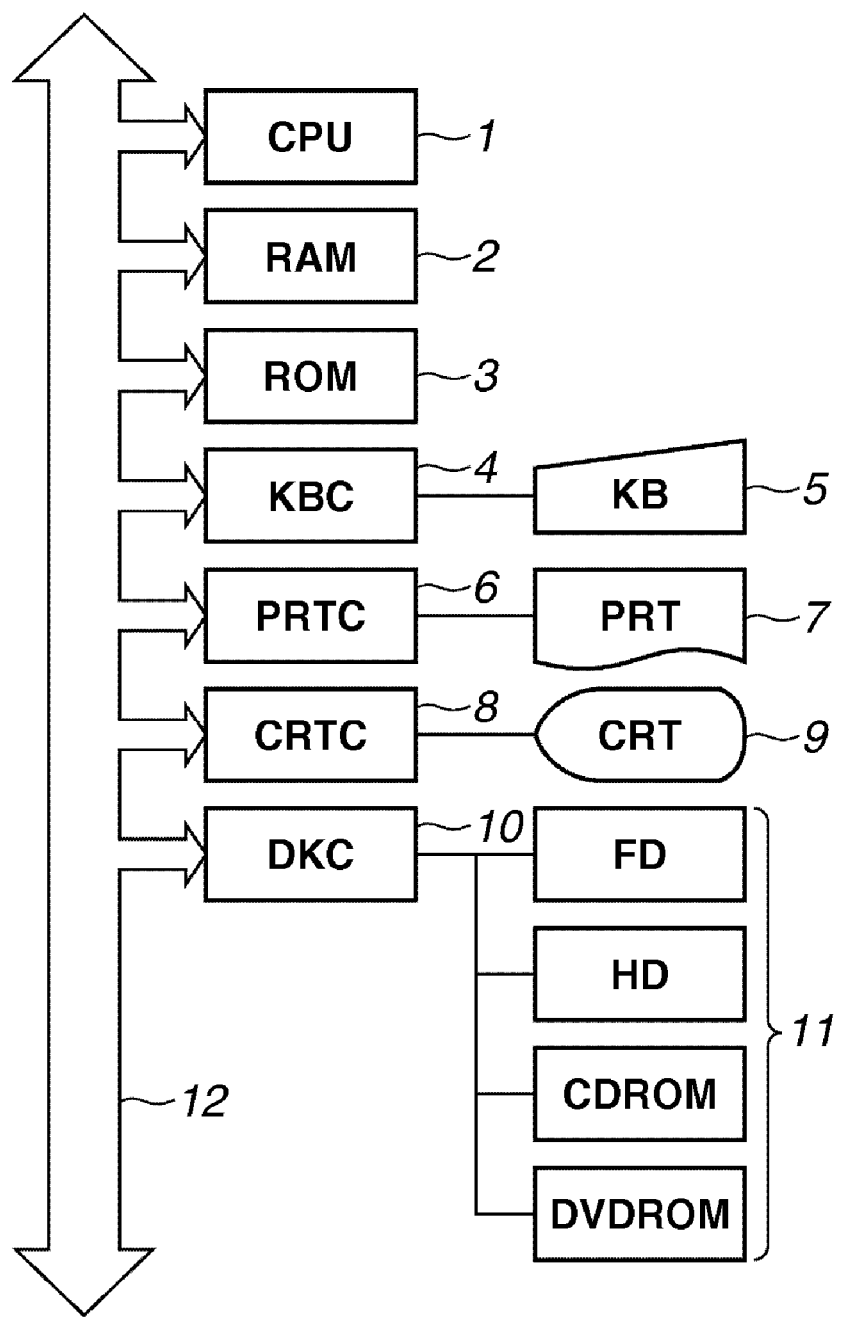
FIG. 2 is a block diagram illustrating a configuration of an image forming apparatus illustrated in FIG. 1.

FIG. 2 is a block diagram illustrating a configuration of the image forming apparatus illustrated in FIG. 1A.

Referring to FIG. 2, a CPU 1 performs control of the entire apparatus and calculation processes. A RAM 2 is an area in which programs and data of each process are loaded and executed. A ROM 3 is an area for storing a system control program and font data.

A keyboard control unit (KBC) 4 receives data by a key input from a keyboard (KB) 5 and transmits the data to the CPU 1. A printer control unit (PRTC) 6 controls a printer apparatus (PRT) 7. The PRT 7 is, for example, a laser beam printer or an inkjet printer. A display control unit (CRTC) 8 controls of display on a display device (CRT) 9. A disk control unit (DKC) 10 performs control of data transmission.

An external storage device 11 includes a flexible disk apparatus (FD), an HD, a compact disc (CD)-ROM, and a digital versatile disc (DVD)-ROM. When the CPU 1 performs data processing, the CPU 1 refers to or loads on to the RAM 2 programs and data stored in the external storage device 11. A system bus 12 is a path for transferring data between the above-described components.

The above-described image forming apparatus is activated by the CPU 1 executing a basic input/output (I/O) program, OS, and an electronic data compression program described below.

The basic I/O program is stored in the ROM 3, and the OS is written in the HD of the external storage device 11. When the image forming apparatus is switched on, the OS is read from the HD of the external storage device 11 into the RAM 2 by an initial program loading (IPL) function in the basic I/O program. The OS is thus activated.

Figure 3:
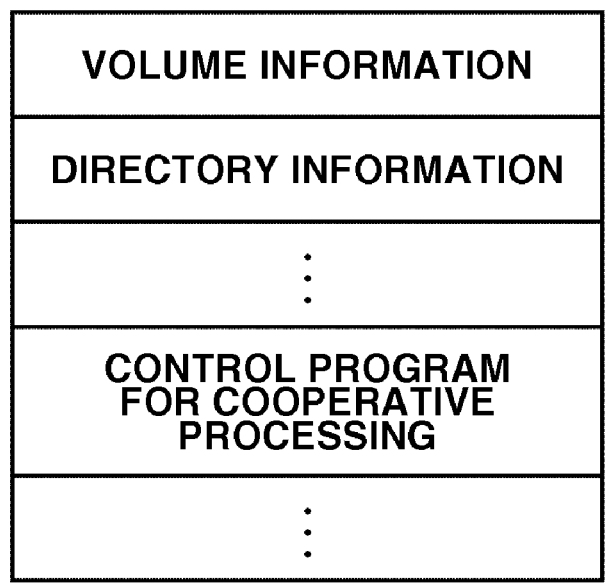
FIG. 3 illustrates an example of a memory map of a storage medium that stores a program installed in an information processing apparatus according to an exemplary embodiment of the present invention.

In the present exemplary embodiment, control programs and related data for performing print function cooperative processing are stored in the FD, CD-ROM, or the DVD-ROM that constitute the external storage device 11. An example of a memory map of such a storage medium is illustrated in FIG. 3.

Figure 4:
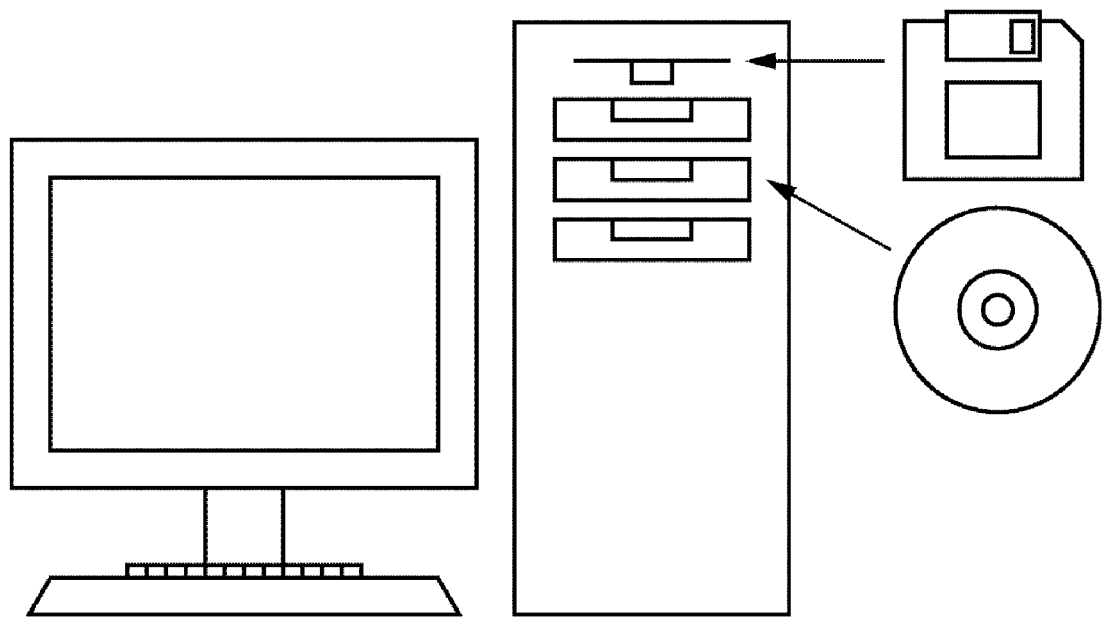
FIG. 4 illustrates an example of a method of installing a program in an information processing apparatus according to the present exemplary embodiment.

Further, control programs and related data for performing image processing with cooperative function can be installed in an HD of the information processing apparatus via a FD drive, a CD-ROM drive, or a DVD-ROM drive, as illustrated in FIG. 4.

In such a case, when the FD, CD-ROM, or the DVD-ROM is set in the drive, control program and related data for the image processing with cooperative function are read out according under control performed by the OS and the basic I/O program, and are installed in the HD to be executable.

FIG. 5 illustrates an example of a memory map of the RAM 2 in the image forming apparatus illustrated in FIG. 2. In the present example, a control program for performing the image processing with cooperative function is loaded from the external storage device 11 to the RAM 2.

The job ticket (JT) in the present exemplary embodiment will be described below. An instruction for performing a printing operation is written in the JT according to a certain format, and an output apparatus performs a process based on the instruction.

A well-known format for describing an instruction is JDF, established by the International Cooperation For Integration of Processes in Prepress, Press and Postpress (CIP 4).

JDF is a format to which prepress operation information called portable job ticket format (PJTF) that is proposed by Adobe Systems Incorporated and a control attribute are appended. JDF offers information integration of prepress, press, and postpress, collaboration of production with a process control manager, and compatibility with the existing system.

In addition, JDF follows an architecture in which a job ticket is sent and received, which PJTF is good at. Based on the structure of JDF, each of an operation history, a job ticket, and control information, is subjected to necessary processing sequentially performed in each process and is transferred to a subsequent process. Contents of a plurality of processes, an order of processes, and an information processing apparatus which executes each process are described in the job ticket.

Further, in JDF, extensible markup language (XML) is utilized as a language for structuring the job ticket. JDF defines a template called schema in which elements of the XML and arrangement of attributes are described. FIG. 6 illustrates an example of a JT described using JDF.

FIG. 7 illustrates a configuration of the information processing system according to the present exemplary embodiment. In the system, in addition to three information processing apparatuses that function as clients, three image forming apparatuses including print-related functions are connected to a network.

Referring to FIG. 7, a user uses a user interface (UI) displayed on an information processing apparatus 71 to select functions to be used in a series of image forming process, from functions provided in the system. The system then automatically searches for apparatuses in the system to be used for realizing the designated functions.

For example, as illustrated in FIG. 8A, the user selects functions A, B, C, and D as a function 81, and an image forming apparatus 76 as an output apparatus 82. The system then searches for a system-determined initial path 83, and a flow indicating the initial path of the image forming process is determined.

Figure 9:
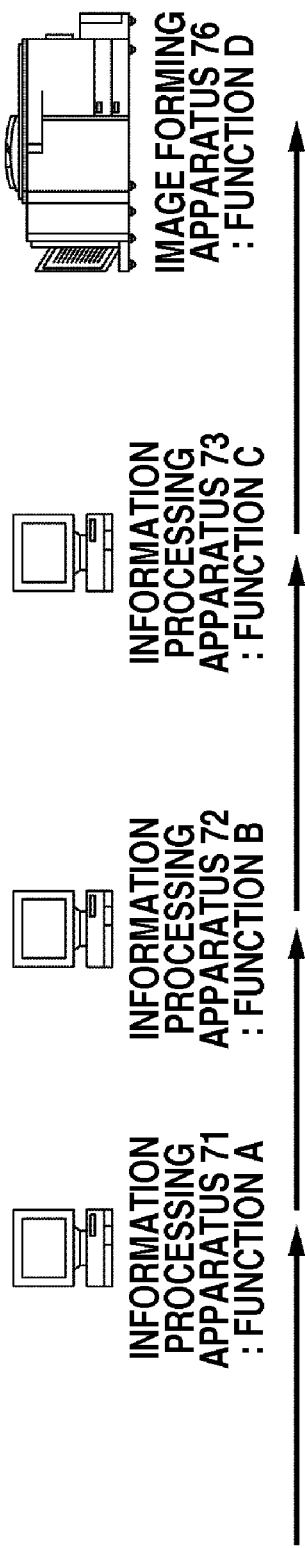
FIG. 9 illustrates a process of cooperatively performing functions in the information processing system according to an exemplary embodiment of the present invention.

In the above-described case, the functions are sequentially performed in a direction of arrows illustrated in FIG. 9. Further, the search is performed by referring to a system map such as an example illustrated in FIG. 10, that store information about functions provided in the information processing apparatuses and the image forming apparatuses in the system.

For example, function A corresponds to a predetermined imaging process performed by the information processing apparatus 71 illustrated in FIG. 9, and includes a process of rasterizing into a bitmap image. Further, function B corresponds to a predetermined imaging process performed by an information processing apparatus 72 illustrated in FIG. 9, and includes a process of rasterizing into a bitmap image.

Further, function C corresponds to a predetermined imaging process performed by an information processing apparatus 73 illustrated in FIG. 9. Further, function D corresponds to a predetermined printing process performed by the image forming apparatus 76 illustrated in FIG. 9.

In the information processing system according to the present exemplary embodiment, the information processing apparatuses 71, 72, and 73 and the image forming apparatus 76 execute the above-described functions A, B, C, and D. The functions A, B, C, and D together perform a cooperative printing process.

FIG. 10 illustrates an example of a system map in the information processing system according to the present exemplary embodiment. Each image forming apparatus and information processing apparatus can also acquire the system map from the server and refer to the latest system map.

Referring to FIG. 10, the system map stores device identification information, location, function identification information, input data format, and output data format as a management table.

The system map can be automatically generated by mutual communication between the apparatuses in the system, or by a user input.

In the present exemplary embodiment, the information processing system performs a printing process according to a determined initial process path illustrated in FIG. 9.

However, there is a case where a problem occurs in cooperative processing, such as a problem in function C that corresponds to the information processing apparatus 73 illustrated in FIG. 11.

More specifically, in the process illustrated in FIG. 11, function A which corresponds to the information processing apparatus 71 and function B which corresponds to the information processing apparatus 72 are normally performed. However, a problem occurs in function C which corresponds to the information processing apparatus 73. As a result, the subsequent data processing cannot be normally performed, and function D which corresponds to the image forming apparatus 76 cannot be performed. An example of a process of changing a process path when such a problem occurs will be described below.

Figure 13:
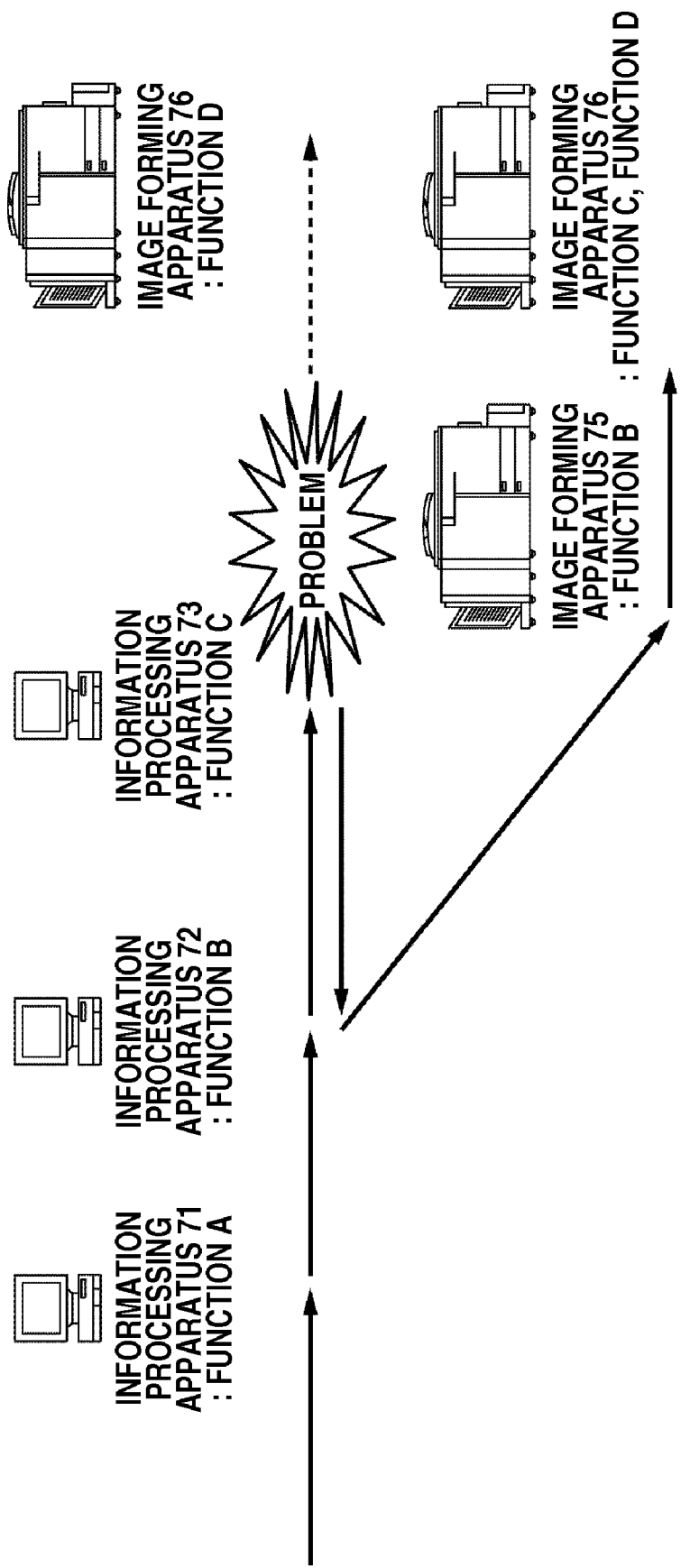
FIG. 13 illustrates a process of cooperatively performing functions in the information processing system according to an exemplary embodiment of the present invention.
Figure 14:
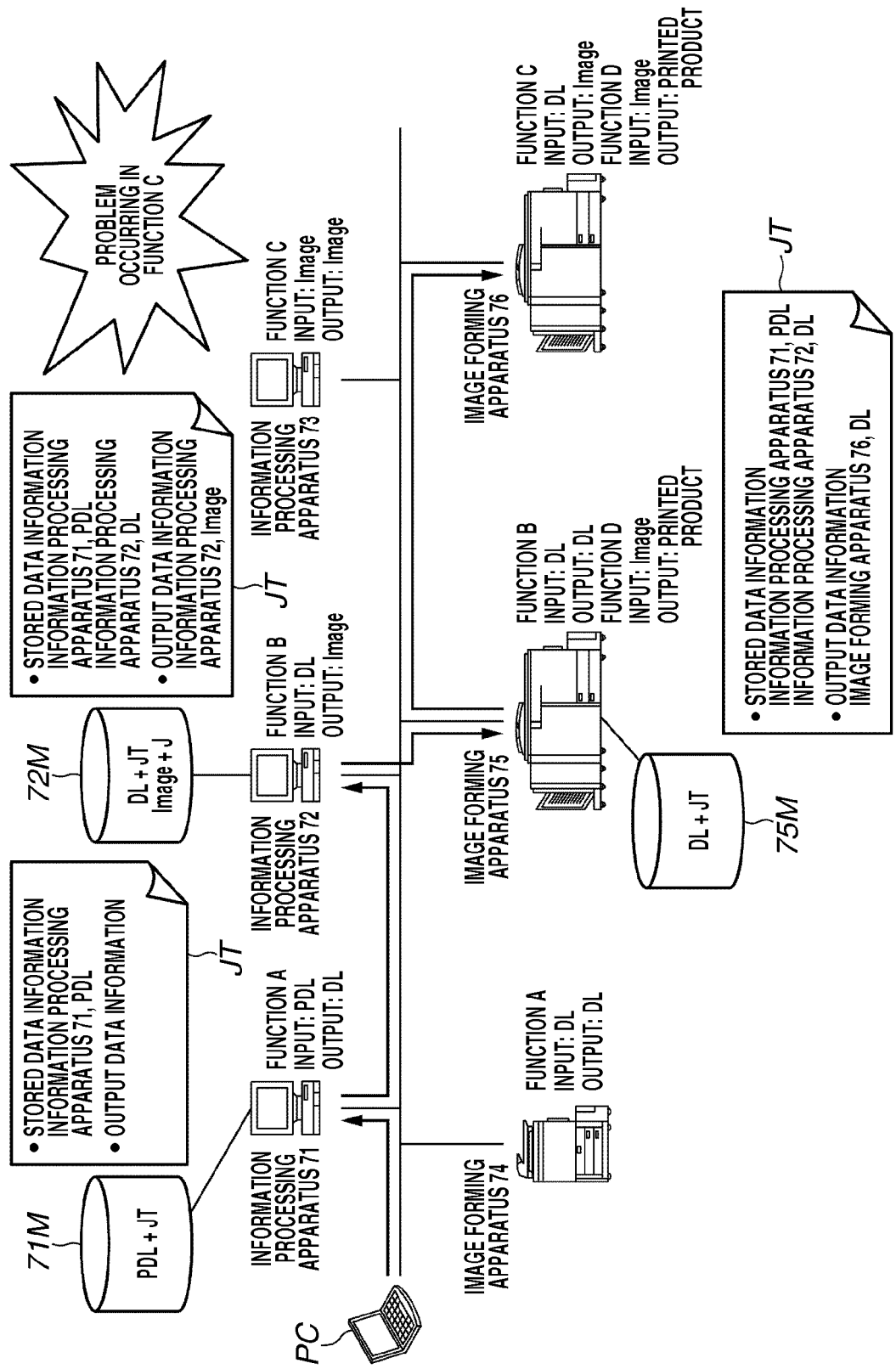
FIG. 14 illustrates a process of cooperatively performing functions in the information processing system according to an exemplary embodiment of the present invention.

FIGS. 12, 13, and 14 illustrate an example of a process of cooperatively performing functions in the image processing system according to the present exemplary embodiment. Components similar to those illustrated FIG. 11 are assigned the same reference numbers.

In FIGS. 12 and 14, JT refers to job ticket, and 71M, 72M, and 75M indicate storage devices.

In the system illustrated in FIG. 12, since a process performed by the information processing apparatus 71 is normally ended, the information processing apparatus 71 transmits a normal end notification to an apparatus that performed the previous function. In this case, the notification is transmitted to a user client information processing apparatus that issued a print instruction. At this time, the information processing apparatus 71 describes a history of normal ending of the process in the JT, in which storage data information and output data information are described, as illustrated in FIG. 8B.

Further, when the system is observed from the information apparatus 71, the information processing apparatuses 72 and 73, and the image forming apparatuses 74, 75, and 76 correspond to external apparatuses. The information processing apparatus 71 thus transmits to the subsequent external apparatus, a job ticket describing the processed data as a result of executing the function according to the job ticket, and a function to be subsequently executed.

The data output after executing a function is temporarily stored in the storage device as output data. Further, if the function which corresponds to the information processing apparatus 71 is function A, the input data format and the output data format are different, as described in the system map illustrated in FIG. 10. Therefore, the information processing apparatus 71 previously stores input data in the storage device 71M as temporarily stored data.

In such a case, the information processing apparatus 71 describes the apparatus storing the output data and the data format of the output data as output data information in the JT. Further, the information processing apparatus 71 describes the apparatus storing the storing data and the data format of the storing data as storing data information in the JT. The information processing apparatus 71 then transmits the JT in which the above-described contents are described, to the information processing apparatus 72 which is to perform the subsequent process, along with the data.

The information processing apparatus 72 similarly performs the scheduled process of function B. In this case as well, since the process is normally ended, the information processing apparatus 72 transmits a normal end notification to the information processing apparatus 71 that performed the previous function. Upon receiving the notification, the information processing apparatus 71 deletes the output data stored in the storage device 71M.

The information processing apparatus 72 stores the output data. Further, since the data formats of the input data and the output data are different, the information processing apparatus 72 stores the stored data in the storage device 72M, and describes information about each data in the JT. Further, the information processing apparatus 72 transmits the data and the JT in which the above-described contents are described to the information processing apparatus 73.

In the information processing apparatus 73, a problem occurs while performing a process as described above, so that a normal end notification is not transmitted to the information processing apparatus 72 that processed the previous function.

Since the information processing apparatus 72 does not receive a normal end notification from the information processing apparatus 73 within a certain period of time, the information processing apparatus 72 determines that a problem has occurred. Therefore, the information processing apparatus 72 searches for an apparatus that performs the function C in place of the information processing apparatus 73 in the system, and a corresponding new process path, by referring to the system map illustrated in FIG. 10. As a result, the information processing apparatus 72 determines the new process path as illustrated in FIG. 13.

The information processing apparatus 72 then determines from the system map illustrated in FIG. 10 that, other than the information processing apparatus 73, only the image forming apparatus 76 includes function C in the system. However, an input data format of function C in the image forming apparatus 76 is DL.

Therefore, the information processing apparatus 72 searches for a process path, considering usage of the stored data in a DL format stored in the information processing apparatus 72. Since the data in the DL format stored in the information processing apparatus 72 corresponds to input data of function B, it is necessary to search for other information processing apparatus that performs function B and in which the output data is in a DL format.

An information processing apparatus that matches the above-described condition is the image forming apparatus 75. Therefore, as illustrated in FIG. 13, the information processing apparatus 72 searches for a substitute process path in which the image forming apparatuses 75 and 76 perform function C and function D, as a process path to be followed. The other processes are performed as previously performed. The information processing apparatus 72 uses the system map illustrated in FIG. 10 to search for the substitute process path.

The system map used by the information processing apparatus 72 can be a system map in each apparatus, or a system map described in a JT by a user client system.

When the scheduled final function D is normally processed, notification indicating that all functions have normally ended is transmitted to all data storage devices described in the JT, and all stored data are thus deleted. As described above, when a problem occurs in the system, a substitute process path is automatically searched in the system.

As a result, if a designated function is not normally ended in an external apparatus which is to perform a subsequent process designated by the job ticket, the information processing apparatus can determine that the designated function processing has failed in the information processing apparatus that performs the subsequent function process.

In such a case, the information processing apparatus refers to the system map and searches for an information processing apparatus or an image forming apparatus that can realize a cooperative processing designated in the job ticket. As a result of the search, the information processing apparatus identifies a new information processing apparatus or image forming apparatus that is to cooperatively perform initial function processing. The information processing apparatus then updates a description of contents of the processes, an order of performing the processes, and the information processing apparatus which is to execute each process. Therefore, even if a function to be cooperatively performed is not normally executed, cooperative function processing can be continued by using an information processing apparatus or an image forming apparatus in the system. The information processing apparatus does not include an information processing apparatus that did not receive a normal response from the subsequent information processing apparatus in the job ticket to be updated.

However, the present status of each image forming apparatus and information processing apparatus in the system map managed by the information processing apparatus can be managed as a system status. More specifically, if a subsequent cooperative processing is requested, the information process apparatus that previously failed can be included by referring to the latest system status.

An example of the data processing flow of the present exemplary embodiment will be described below with reference to the flowcharts illustrated in FIGS. 15 and 16.

Figure 15:
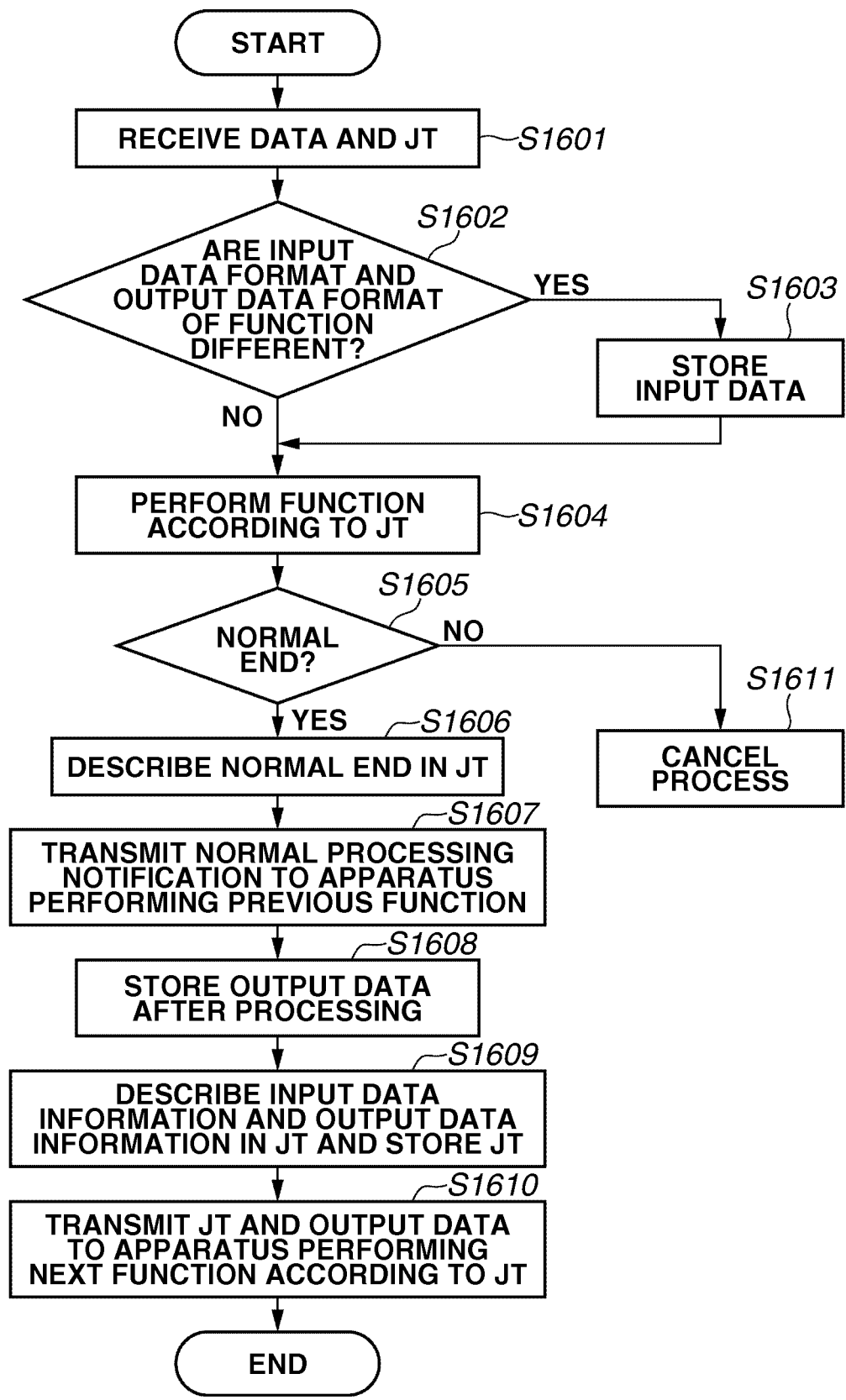
FIG. 15 is a flowchart illustrating a first data processing procedure in the information processing system according to an exemplary embodiment of the present invention.

FIG. 15 is a flowchart illustrating an example of a first data processing procedure in the information processing apparatus according to the present exemplary embodiment. The flowchart illustrates an example of receiving and sending a process in a client terminal and an image forming apparatus (hereinafter referred to as apparatus) in the system illustrated in FIG. 14. Each of the steps S1601 to S1611 is realized by a CPU of the information processing apparatus and the image forming apparatus loading and executing a control program.

In the description below, an information processing apparatus designating a function, and an information processing apparatus or an image forming apparatus that processes a designated function will be referred to as an apparatus. Further, as illustrated in FIG. 1B, the information processing apparatus includes the NC 106, by which the information processing apparatus communicates with other information processing apparatus or image forming apparatus via a network. As a result, the information processing apparatus receives pre-processed print information and transmits print information to be post-processed to an information processing apparatus or image forming apparatus.

In step S1601, an apparatus receives data and a JT transmitted from an information processing apparatus. If the apparatus is performing cooperative processing, the apparatus receives target data from an apparatus that performed the previous function in cooperative processing designated in the JT. Further, if the apparatus is the first apparatus to perform cooperative processing, the apparatus receives the JT and the target data from an external client terminal.

In step S1602, the JDF analysis/correction unit in the apparatus receiving the JT determines whether an input data format and an output data format of the function described in the received JT are different. If the JDF analysis/correction unit determines that the data formats are different (YES in step S1602), the process proceeds to step S1603. In step S1603, the apparatus stores the target input data in a storage device (such as the external memory 109).

On the other hand, if the JDF analysis/correction unit determines that the data formats are the same (NO in step S1602), the process proceeds to step S1604. In step S1604, the apparatus receiving the JT performs the function desired by the user according to the JT.

In step S1605, the JDF analysis/correction unit determines whether the process has normally ended. If the JDF analysis/correction unit determines that the process has not normally ended (NO in step S1605), the process proceeds to step S1611, and the process is cancelled.

On the other hand, if the JDF analysis/correction unit determines that the process has normally ended (YES in step S1605), the process proceeds to step S1606. In step S1606, the JDF analysis/correction unit describes that the process has normally ended, as history in the JT.

In step S1607, the apparatus transmits a normal processing notification to an information processing apparatus that performed the previous function. If the apparatus is an apparatus that performs the first function, the apparatus transmits the notification to a client terminal that instructed the operation.

In step S1608, the JDF analysis/correction unit stores the data output after the process is normally performed in the storage device.

In step S1609, the JDF analysis/correction unit describes in the JT, input data information including input data format and the name of the apparatus storing the input data, and output data information including output data format and the name of the apparatus storing the output data. The JDF analysis/correction unit then stores the JT in the storage device.

In step S1610, the NC 106 transmits the output data and the JT to an information processing apparatus or an image forming apparatus that is to execute the subsequent function, according to the description in the JT. The process then ends.

Figure 16:
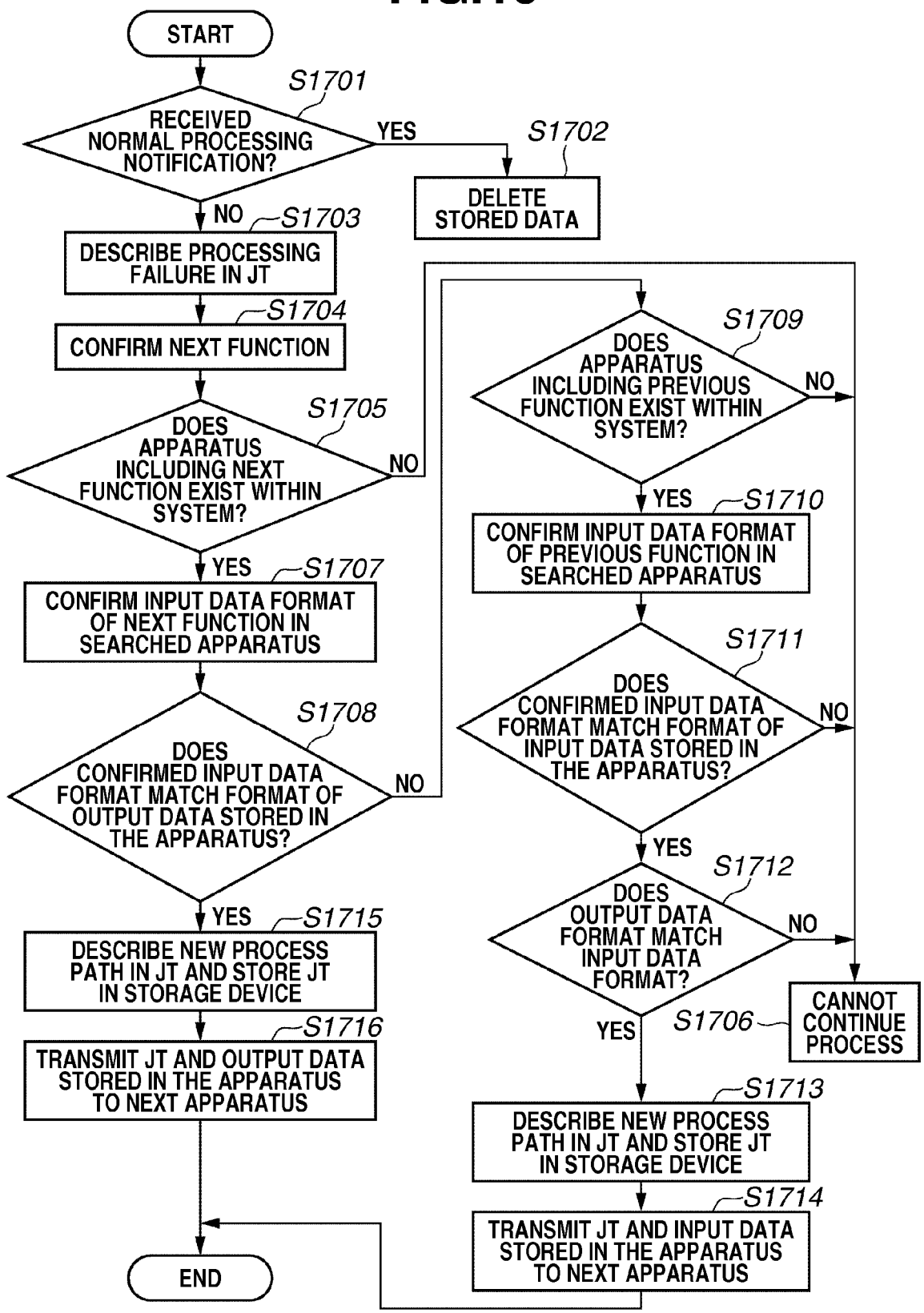
FIG. 16 is a flowchart illustrating a second data processing procedure in the information processing system according to an exemplary embodiment of the present invention.
Figure 18:
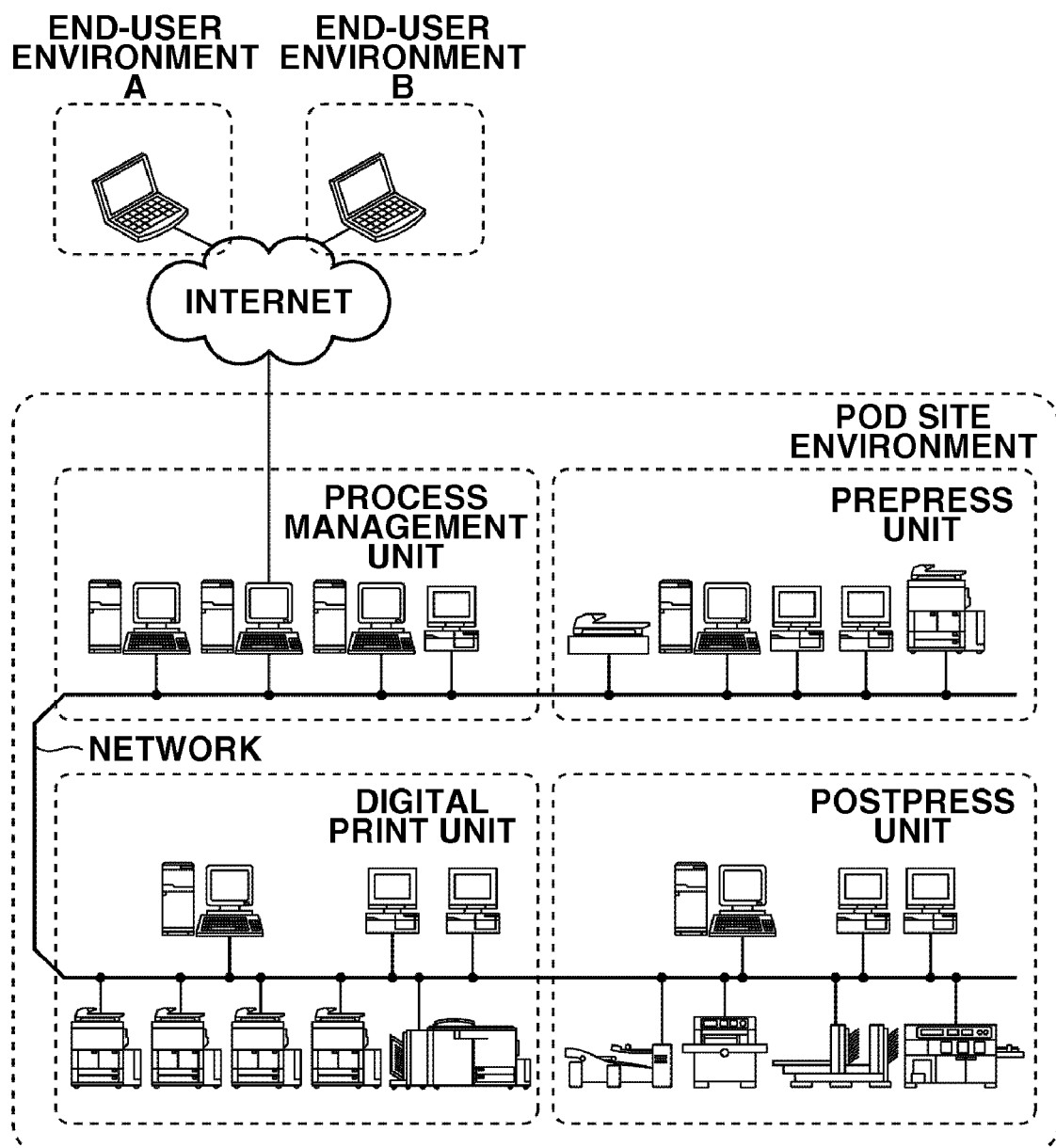
FIG. 18 illustrates an example of a conventional electrophotographic system.

FIG. 16 is a flowchart illustrating an example of a second data processing procedure in an information processing apparatus according to the present exemplary embodiment. More specifically, the flowchart corresponds to a detailed procedure of searching for a new process path, which is caused by cancellation of the proceeding in step S1611 illustrated in FIG. 15. The process is performed by an information processing apparatus or an image forming apparatus as an apparatus in the system. Each of the steps S1701 to S1716 are realized by a CPU of the information processing apparatus or the image forming apparatus loading and executing a control program. In the description below, an information processing apparatus and an image forming apparatus will be referred to as an apparatus.

In step S1701, the information processing apparatus transmits the JT and the corresponding data to the subsequent information processing apparatus to perform cooperative processing. The information processing apparatus then determines whether a normal processing notification is received within a predetermined period of time from the information processing apparatus (or the image forming apparatus) which is to process the subsequent function.

If the information processing apparatus determines that the normal processing notification (i.e., a notification of success) has been received (YES in step S1701), the process proceeds to step S1702. In step S1702, the information processing apparatus deletes the output data and the JT stored in a storage device. As a result, a state where the post-process information occupies a large area in the storage device of the information processing apparatus is quickly resolved, and the storage device can be effectively utilized.

On the other hand, if the information processing apparatus determines that the normal processing notification (i.e., a notification of success) has not been received (NO in step S1701), the process proceeds to step S1703, and the apparatus describes that the process failed, as history in the JT stored in the storage device.

In step S1704, the JDF analysis/correction unit confirms the subsequent function in the JT stored in the storage device.

In step S1705, the JDF analysis/correction unit searches whether the confirmed subsequent function exists in the system based on a system map, and determines whether there is other apparatus in the system in which the subsequent function is installed. If the JDF analysis/correction unit determines that there is no apparatus in which the subsequent function is installed (NO in step S1705), the process proceeds to step S1706, and the process becomes unable to be continued. The above-described process of searching for an apparatus having the subsequent function installed in the system corresponds to a first search process. Further, the process of searching for an apparatus having the previous function installed in the system corresponds to a second search process.

On the other hand, if the JDF analysis/correction unit determines that there is an apparatus including the subsequent function in the system (YES in step S1705), the process proceeds to step S1707. In step S1707, the JDF analysis/correction unit confirms an input data format of the subsequent function in the searched apparatus.

In step S1708, the JDF analysis/correction unit determines whether the confirmed input data format matches the format of the output data stored in the apparatus, and whether the searched apparatus can interpret the stored output data format. If the JDF analysis/correction unit determines that the input data format does not match the format of the output data stored in the apparatus (i.e., cannot interpret the output data) (NO in step S1708), the process proceeds to step S1709.

In step S1709, the JDF analysis/correction unit determines whether there is another apparatus in the system which includes the previous function that the apparatus normally processed. If the JDF analysis/correction unit determines that there is no apparatus including the previous function in the system (NO in step S1709), the process proceeds to step S1706, and the process is unable to be continued.

On the other hand, if the JDF analysis/correction unit determines that there is other apparatus including the previous function in the system (YES in step S1709), the process proceeds to step S1710. In step S1710, the JDF analysis/correction unit confirms the input data format of the previous function in the searched apparatus.

In step S1711, the JDF analysis/correction unit determines whether the confirmed input data format matches the format of the input data stored in the apparatus. If the JDF analysis/correction unit determines that the confirmed input data format is different from the format of the input data stored in the apparatus (NO in step S1711), the process proceeds to step S1706, and the process is unable to be continued.

On the other hand, if the JDF analysis/correction unit determines that the confirmed input data format matches the format of the input data stored in the apparatus (YES in step S1711), the process proceeds to step S1712.

In step S1712, the JDF analysis/correction unit determines whether the output data format of the apparatus determined to match the format of the input data stored in the apparatus in step S1711, matches the format of the input data of the apparatus searched for in step S1707. If the JDF analysis/correction unit determines that the data formats match each other (YES in step S1712), the process proceeds to step S1713 to update the JT. If the JDF analysis/correction unit determines that the data formats do not match (NO in step S1712), the process proceeds to step S1706.

In step S1713, the JDF analysis/correction unit describes in the JT a new process path following the previous function using the searched for apparatus, and stores the JT in the storage device.

In step S1714, the NC 106 transmits the JT and the input data stored in the apparatus to the subsequent apparatus according to the JT. The process then ends.

Returning to step S1708, if the JDF analysis/correction unit determines that the input data format matches the format of the output data stored in the apparatus (i.e., can interpret the output data) (YES in step S1708), the process proceeds to step S1715. In step S1715, the JDF analysis/correction unit describes in the JT a new process path starting from the subsequent function using the searched for apparatus, and stores the JT in the storage device.

In step S1716, the NC 106 transmits the JT and the output data stored in the apparatus to the subsequent apparatus according to the JT. The process then ends.

In the present exemplary embodiment, a cooperative process path is changed due to a time out in step S1701.

However, when the process is cancelled in step S1611 illustrated in FIG. 15, the apparatus can transmit a notification that the process failed to an apparatus that performed the previous process. The apparatus receiving the failure notification then performs the process from step S1703 and thereafter illustrated in FIG. 16, and cooperative processing can be instantly continued.

As described above, a description in the job ticket cannot be changed in a conventional information processing system. Embodiments of present invention are thus directed to a method and apparatus for continuing a designated function processing when a plurality of apparatuses cooperate to perform a plurality of functions described in a job ticket. That is, the designated function processing may be continued by updating the description in a job ticket, even if one of the function processing is discontinued.

FIG. 17 illustrates a memory map of a storage medium which can be read by the information system including the information processing apparatuses and the image forming apparatuses according to the present invention. The storage medium stores various data processing programs that can be read by the information processing system according to an exemplary embodiment of the present invention.

Further, information for managing program groups stored in a storage medium, such as version information and creator can be stored in the storage medium. Further, information that depends on an OS which reads a program, such as an icon for identifying and displaying a program, can be stored in the storage.

Further, data belonging to various programs are managed by the directory. Further, a program for installing various programs to a computer, or a program for decompressing a compressed program to be installed can be stored in the storage medium.

Functions illustrated in FIGS. 15 and 16 in the above-described exemplary embodiments can be realized by a computer executing a program installed from an external source. In such a case, the present invention is applicable if an information group including the program is supplied to an output apparatus from a storage medium such as a CD-ROM, flash memory, or a FD, or an external storage medium via a network.

Aspects of the present invention can also be achieved by providing a storage medium which stores software (program code) and/or computer-executable instructions for implementing functions of the above-described exemplary embodiments to a system or an apparatus. The software (program code) stored in the storage medium can be read and executed by a computer (central processing unit (CPU) or micro-processing unit (MPU)) of the system or the apparatus.

In this case, the software (program code) and/or computer-executable instructions may realize the functions of the above-described exemplary embodiments using the computer. The software (program code) and/or computer-executable instructions and the storage medium which stores the software (program code) and/or computer-executable instructions constitute an embodiment of the present invention.

A computer executable program and/or computer-executable instructions to implement the above-mentioned exemplary embodiments can take any form readable by computer, for example, object code, a program executed by an interpreter, or script data supplied to an operating system (OS).

The storage medium can be, for example, at least one of a floppy disk, a hard disk, a magneto-optical disk, a CD-ROM, a CD-recordable (CD-R), a CD-rewritable (CD-RW), a magnetic tape, a nonvolatile memory card, a ROM, and a digital versatile disc (DVD).

Such software (program code) and/or computer-executable instructions can also be supplied by the system or the apparatus accessing a website on the Internet via the browser of a client computer. The software (program code) and/or computer-executable instructions or a compressed file including an auto-install function can be downloaded from the website onto a hard disk. In addition, the program code and/or computer-executable instructions can be broken up into a plurality of files, and each file can be downloaded from one or more websites. Namely, the present invention can be applied to a World Wide Web (WWW) server that allows numerous users to download the program files so that the functions or processes according to the present invention can be realized on their computers.

Furthermore, such software (program code) and/or computer-executable instructions can be encrypted and stored in a storage medium, such as a CD-ROM, to be distributed to users. A user who meets given conditions can download the key information for decrypting the program and/or computer-executable instructions from a website through the Internet. By using the key information, the encrypted program and/or computer-executable instructions can be executed and installed in a computer to realize the functions of the present invention.

Furthermore, the above-described exemplary embodiments can be not only realized by executing software (program code) and/or computer-executable instructions read by a CPU. An operating system (OS) or the like working on a computer can also perform a part or the whole of processes according to instructions of the software (program code) and/or computer-executable instructions and realize functions according to the above-described exemplary embodiments.

Furthermore, software (program code) and/or computer-executable instructions read from a storage medium can be stored in a memory equipped in a function expansion board inserted in a computer or a function expansion unit connected to a computer, and a CPU in the function expansion board or the function expansion unit can execute all or a part of the processing based on the instructions of the software (program code) and/or computer-executable instructions to realize the functions according to the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-105357 filed Apr. 15, 2008, which is hereby incorporated by reference herein in its entirety.

What is claimed is:

1. An information processing apparatus that executes a part of cooperative processing in a system which provides cooperative processing using a plurality of information processing apparatuses, based on a job ticket in which contents of a plurality of processes, an order of processes, and an information processing apparatus which executes each process are described, the information processing apparatus comprising:

a receiving unit configured to receive the job ticket and data that are a target of cooperative processing;

a processing unit configured to process the data using functions included in the information processing apparatus based on the job ticket;

a storing unit configured to store processed data processed by the processing unit when a process is normally completed by the processing unit;

a transmission unit configured to transmit the job ticket and the processed data to an external apparatus which performs a subsequent process of the information processing apparatus designated by the job ticket;

an updating unit configured to update, if it is determined that the subsequent process failed in the external apparatus which performs the process subsequent to the information processing apparatus designated by the job ticket, a description on contents of the plurality of processes, the order of processes, and the information processing apparatus which executes each process in the job ticket, to realize cooperative processing described in the job ticket; and a first search unit configured to search the system for a substitute apparatus including a function for executing the subsequent process that failed, wherein the updating unit updates the job ticket not to include the external apparatus that failed the process, wherein the updating unit updates, if the function included in the substitute apparatus searched for by the first searching unit can interpret a data format of the processed data, the description in the job ticket to include the substitute apparatus, and wherein the transmission unit transmits to the substitute apparatus the job ticket updated by the updated unit and the processed data.

2. The information processing apparatus according to claim 1, wherein the updating unit determines that, if the updating unit does not receive a success notification from the external apparatus performing the subsequent process within a predetermined period of time from the transmission unit transmitting the job ticket and the processed data, the subsequent process failed in the external apparatus performing the subsequent process.

3. The information processing apparatus according to claim 1, wherein the updating unit determines that, if the updating unit receives a failure notification from the external apparatus performing the subsequent process, the subsequent process failed in the external apparatus performing the subsequent process.

4. The information processing apparatus according to claim 1, wherein the storing unit stores data received from the receiving unit as input data, and further comprising:

a second search unit configured to search for, if the function included in the substitute apparatus searched for by the first search unit cannot interpret the data format of the processed data, another substitute apparatus including a function for executing the process performed in the processing unit, wherein the updating unit updates, if the function included in the other substitute apparatus searched for by the second search unit can interpret the data format of the input data stored by the storing unit, and if the function included in the substitute apparatus searched for by the first search unit can interpret the data format of the data after the input data is processed by the function included in the other substitute apparatus searched for by the second search unit, the job ticket to include the substitute apparatuses searched for by the first search unit and the second search unit, and wherein the transmission unit transmits the job ticket updated by the updating unit and the input data to the substitute apparatus searched for by the second search unit.

5. An information processing method in an information processing apparatus that executes a part of cooperative processing in a system which provides cooperative processing using a plurality of information processing apparatuses, based on a job ticket in which contents of a plurality of processes, an order of processes, and an information processing apparatus which executes each process are described, the information processing method comprising:

receiving the job ticket and data that are a target of cooperative processing;

processing the data using functions included in the information processing apparatus based on the job ticket;

storing the processed data in the storing unit when a process is normally completed;

transmitting the job ticket and the processed data to an external apparatus which performs a subsequent process of the information processing apparatus designated by the job ticket;

updating, if it is determined that the subsequent process failed in the external apparatus which performs the process subsequent to the information processing apparatus designated by the job ticket, a description on contents of the plurality of processes, the order of processes, and the information processing apparatus which executes each process in the job ticket, to realize cooperative processing described in the job ticket and a first search process to search the system for a substitute apparatus including a function for executing the subsequent process that failed, wherein the job ticket is updated not to include the external apparatus that failed the process, and wherein the description in the job ticket is updated to include the substitute apparatus, if the function included in the substitute apparatus searched for in the first search process can interpret a data format of the processed data, and the updated job ticket and the processed data are transmitted to the substitute apparatus.

6. The information processing method according to claim 5, wherein updating is performed when the subsequent process is determined to have failed in the external apparatus performing the subsequent process, if success notification is not received from the external apparatus performing the subsequent process within a predetermined period of time from transmitting the job ticket and the processed data.

7. The information processing method according to claim 5, wherein updating is performed when the subsequent process is determined to have failed in the external apparatus performing the subsequent process, if a failure notification is received from the external apparatus performing the subsequent process.

8. The information processing method according to claim 5, wherein the storing unit stores the received data as input data, and further comprising:

a second search process to search for, if the function included in the substitute apparatus searched for in the first search process cannot interpret the data format of the processed data, another substitute apparatus including a function for executing the process performed by the information processing apparatus, wherein a description in the job ticket is updated, if the function included in the other substitute apparatus searched for in the second search process can interpret the data format of the stored input data, and if the function included in the substitute apparatus searched for in the first search process can interpret the data format of data after the input data is processed by the function included in the other substitute apparatus searched for in the second search process, to include the substitute apparatuses searched for in the first search process and the second search process, and wherein the updated job ticket and the input data are transmitted to the other substitute apparatus searched for in the second search process.

9. A non-transitory computer-readable storage medium having computer-executable instructions stored thereon for causing a computer to perform an information processing method in an information processing apparatus that executes a part of cooperative processing in a system which provides cooperative processing using a plurality of information processing apparatuses, based on a job ticket in which contents of a plurality of processes, an order of processes, and an information processing apparatus which executes each process are described, the computer-readable storage medium comprising:

computer-executable instructions for receiving the job ticket and data that are a target of cooperative processing;

computer-executable instructions for processing the data using functions included in the information processing apparatus based on the job ticket;

computer-executable instructions for storing the processed data in the storing unit when a process is normally completed;

computer-executable instructions for transmitting the job ticket and the processed data to an external apparatus which performs a subsequent process of the information processing apparatus designated by the job ticket; and computer executable instructions for updating, if it is determined that the subsequent process failed in the external apparatus which performs the process subsequent to the information processing apparatus designated by the job ticket, a description on contents of the plurality of processes, the order of processes, and the information processing apparatus which executes each process in the job ticket, to realize cooperative processing described in the job ticket; and computer executable instructions for a performing a first search process to search the system for a substitute apparatus including a function for executing the subsequent process that failed, wherein the job ticket is updated not to include the external apparatus that failed the process, and wherein the description in the job ticket is updated to include the substitute apparatus, if the function included in the substitute apparatus searched for in the first search process can interpret a data format of the processed data, and the updated job ticket and the processed data are transmitted to the substitute apparatus.

* * * * *